US009280901B2

(12) United States Patent
Chen

(10) Patent No.: US 9,280,901 B2
(45) Date of Patent: Mar. 8, 2016

(54) METHOD FOR DISPLAYING THE VEHICLE SAFETY DISTANCE

(71) Applicant: E-LEAD ELECTRONIC CO., LTD., Changhua (TW)

(72) Inventor: Stephen Chen, Changhua (TW)

(73) Assignee: E-LEAD ELECTRONIC CO., LTD., Changhua (TW)

( * ) Notice: Subject to any disclaimer, the term of this patent is extended or adjusted under 35 U.S.C. 154(b) by 68 days.

(21) Appl. No.: 13/849,974

(22) Filed: Mar. 25, 2013

(65) Prior Publication Data

US 2014/0285364 A1 Sep. 25, 2014

(51) Int. Cl.

| | |
|---|---|
| ***G08G 1/123*** | (2006.01) |
| ***G08G 1/00*** | (2006.01) |
| ***G08G 1/16*** | (2006.01) |
| ***G05B 23/02*** | (2006.01) |
| ***B60Q 1/00*** | (2006.01) |

(52) U.S. Cl.
CPC ...................................... *G08G 1/167* (2013.01)

(58) Field of Classification Search
CPC ............. G08G 1/16; G08G 9/02; G08G 5/04; G08G 1/167; G08G 1/143; G08G 1/205; G08G 1/096716; G08G 1/052; B60W 2550/306; B60W 30/18163; B60W 30/095; G01S 13/931; H04Q 9/14; B60Q 1/525
USPC ................ 340/903, 3.41, 988, 901, 936, 436; 701/301
See application file for complete search history.

(56) References Cited

U.S. PATENT DOCUMENTS

| | | | | |
|---|---|---|---|---|
| 6,373,400 | B1 * | 4/2002 | Fujita | B60K 35/00 340/901 |
| 7,269,493 | B2 * | 9/2007 | Uemura | B60T 8/17557 340/436 |
| 8,269,652 | B2 * | 9/2012 | Seder | G01S 13/723 340/435 |
| 2006/0173611 | A1 * | 8/2006 | Takagi | G01C 21/3407 701/538 |
| 2009/0112389 | A1 * | 4/2009 | Yamamoto | B60C 23/0401 701/31.4 |
| 2010/0253496 | A1 * | 10/2010 | Nishikawa | G01D 7/00 340/441 |
| 2011/0153200 | A1 * | 6/2011 | Tsuji | G01C 21/3658 701/533 |
| 2011/0293145 | A1 * | 12/2011 | Nogami | B60R 1/00 382/103 |
| 2012/0062745 | A1 * | 3/2012 | Han | B62D 15/029 348/148 |
| 2012/0123613 | A1 * | 5/2012 | Waki | G08G 1/167 701/1 |
| 2012/0154591 | A1 * | 6/2012 | Baur et al. | 348/148 |
| 2012/0314055 | A1 * | 12/2012 | Kataoka | G08G 1/167 348/117 |
| 2013/0335213 | A1 * | 12/2013 | Sherony | G08G 1/167 340/439 |
| 2014/0156182 | A1 * | 6/2014 | Nemec | G05D 1/021 701/430 |

* cited by examiner

*Primary Examiner* — George Bugg
*Assistant Examiner* — Munear Akki
(74) *Attorney, Agent, or Firm* — Guice Patents PLLC

(57) ABSTRACT

A method for displaying the vehicle safety distance, which is executed under the basic structure of a vehicle safety warning device, the vehicle safety warning device at least includes a display module and an image recognition module. The method displays various virtual icons of different situations on the road, to display in advance and warn the lane departure situation, to thereby ensure traffic safety.

20 Claims, 13 Drawing Sheets

METHOD FOR DISPLAYING THE VEHICLE SAFETY DISTANCE

BACKGROUND OF THE INVENTION

1. Field of the Invention

A method for displaying the vehicle safety distance and, more particularly, to a method for displaying the vehicle safety distance with predictive display and lane departure warning functions, to thereby warn the driver of the lane departure situation timely, to ensure traffic safety.

2. Brief Description of the Related Art

For the vehicle equipments, safety is most important. In recent years, image recognition and wireless detection technology become more sophisticated, a lot of technology is applied on vehicle safety, such as the functions of suggesting safety distance to the front car and lane departure warning in response to market demand.

Currently, there are two kinds of lane departure warning systems. In one of the two systems, a photoreceptor is set on the location near the two front wheels under the car. When the photoreceptor senses the ground color near the wheels changed, the displayed color of the display unit may change to white or yellow from black, and the system determines that the car departures the lane. The cost of the method is low, but malfunction may be occurred easily. In another system, a camera lens is installed in front of the car, usually in a high place inside the windshield for capturing the image in front of the car, which includes the lane line. An image recognition method is used to extract the lane line in the image and determine the shift amount of the lane line. When the lane line is shifted to the predetermined location, the system determines as lane departure. The cost of the method is high, but the probability of malfunction is low.

There are also two kinds of vehicle safety distance warning systems. In one of the two systems, a millimeter-wave radar (30 GHz~300 GHz) with high frequency or a laser radar is used to perform the determination of the vehicle safety distance, the weathering resistance and the distance performance distance are both excellent, but the cost is high, and the system cannot identify whether the car is in the same lane or in the roadside fence, thus malfunction may be occurred easily. In another system using an image recognition method, the forward object is shot by an image camera lens with fixed angle. The extraction of the forward object is converted into the distance by the elevation angle of the image relative to the image lens. The cost is low, and the same camera lens may be shared with the lane departure warning system to thereby share the cost, but the weathering resistance is bad, and its determination for the front car may be affected by the reasons, such as night, fog, heavy rain.

The above vehicle safety distance warning systems using radar wave are usually installed in the high-priced cars, some of the systems are further connected to the actuator system to start the brakes for assisting brake when necessary. Since the cost of the vehicle safety distance warning systems is high and a lot of components are involved in, it cannot be installed in the common price cars, and it is more difficult for the car owners to install the system by themselves after buying the car.

In the commercially available vehicle safety distance warning systems, the high-end products may drive the brake and the actuator system of the car after determining the front vehicle distance, and may automatically adjust the car speed according to the front vehicle distance to keep an appropriate distance from the front vehicle. Some low-end products may mark the front vehicle distance on the screen after determining it, but the drivers do not have intuitive feelings about this kind of vehicle distance data, thus it is not helpful to the drivers. Another kind of the low-end products warn the driver by images or sounds when the front vehicle distance is too short, the drivers cannot receive enough information to keep the vehicle safety distance before being warned.

If the traditional lane departure warning device does not detect the lane, it does not warn to drivers even when the car has already departed the lane. Similarly, if the vehicle safety distance warning device cannot detect the front car, it does not warn to drivers even when the front vehicle distance is too short. If encounter these situations, instead of improving traffic, this kind of safety devices may let drivers feel safe and not pay attention on the road.

In order to solve the drawbacks of the above vehicle safety systems and warning devices, the industry disclose various related technology continuously, such as the patent reference, such as the patent reference with TW publication no. 200951892 (hereafter called the cited reference), which is a typical representative (as FIG. 1). The portable electronic device 11 of the cited reference is consisted of a camera lens 12, a speaker 13, a computing unit 14, a display unit 15 and a vibration unit 16. The speaker 13 is set on the portable electronic device 11; the camera lens 12 is set on the portable electronic device 11 for capturing a real-time road image 121; the display unit 15 is set on the portable electronic device 11 for displaying the above real-time road image 121. The computing unit 14 is set inside the portable electronic device 11, which includes an image analysis software 141, which judges whether the vehicle is located in the lane according to the traffic markings in the real-time road image 121, the speaker 13 sends out a warning signal 131 to remind the driver that the vehicle is departed the lane if the vehicle is not located inside the lane. If the portable electronic device 11 is set to silent mode, the driver may be reminded that the vehicle is departed the lane by the vibration of the vibration unit 16. The driver may further use the API system to turn on the camera lens 12 to shot the real-time road message, also may open the camera function originally set by the portable electronic device 11 directly to obtain the real-time road image 121, and the shot image may be transmitting to the display unit 15 for displaying by instant transmission technology.

The steps of the operation method of the cited reference (as shown in FIG. 2), the portable electronic device 11 is started to a driving safety mode, in the step 21, a camera lens 12 is used to get the real-time road image 121 actually; and then in the step 22, the real-time road image 121 is sent to the computing unit 14 and displayed on the display unit 15; and then in the step 23, the computing unit 14 is used to analyze the real-time road image 121 by using an image analysis software 141. In step 24, judging whether the vehicle is departed the lane according to the location of the lane on the road in the real-time road image 121. For example, judging whether there is only one or a little part of the strip whose color similar to the two lane lines on the real-time road image 121, if yes, the computing unit 14 judges that the vehicle has already departed the lane; if there are two strips whose color similar to the lane lines on the real-time road image 121, the computing unit 14 judges that the vehicle is in a safe driving condition. If the computing unit 14 judges that the vehicle departs the lane, in step 25, the portable electronic device 11 make a sound to remind the driver that the vehicle maybe departs the lane. If not, repeat executing step 21.

Although the cited reference solved the drawbacks of the traditional vehicle safety systems, the real-time road image 121 shot by the camera lens 12 is a virtual image, which is not as clear as marked lines in visual appearance to impressive the driver. The driver may not easily be aware of the impending driving danger from the images in advance before the vibration or the warning sound starts.

SUMMARY OF THE INVENTION

In view of this, the inventor finally completed the method for displaying the vehicle safety distance of the present invention after numerous improvements, namely, the object of the present invention is to provide a method for displaying the vehicle safety distance with predictive display and lane departure warning functions, to thereby warn the driver of the lane departure situation timely, to achieve advanced prevention to ensure traffic safety.

In order to achieve the above purpose, the first embodiment of the displaying method for vehicle safety warning of the present invention includes a vehicle safety warning device, the vehicle safety warning device has a display module and an image recognition module; different icons are used to be displayed on the display module to show different situations on the road, the displaying steps includes:

A. a double vertical line is displayed on the display module;

B. a first vehicle location icon is displayed on the display module, the first vehicle location icon represents the location of the vehicle, the first vehicle location icon is placed in the middle of the double vertical line, the first vehicle location icon moves left and right according to the actual location in the lane detected by the image recognition module;

C. when the first vehicle location icon displayed on the display module is overlapped on the double vertical line, it means the lane departure, at this time, the double vertical line is showed by a warning icon for caution.

The displaying step A, when the image recognition module cannot detect the lane line, the double vertical line is hidden without being displayed.

The displaying step C, the warning icon is provided to warn by flashing the double vertical line.

The displaying step C, the warning icon is provided to warn by changing the color of the double vertical line.

The second embodiment of the displaying method for vehicle safety warning of the present invention includes a vehicle safety warning device, the vehicle safety warning device has a display module, an image recognition module and a distance detection module; different icons are used to be displayed on the display module to show different situations on the road, the displaying steps includes:

A. a double vertical line is displayed on the display module;

B. a first vehicle location icon is displayed on the display module, the first vehicle location icon represents the location of the present vehicle, the first vehicle location icon is placed in the middle of the double vertical line, the first vehicle location icon moves left and right according to the actual location in the lane detected by the image recognition module;

C. when the first vehicle location icon displayed on the display module is overlapped on the double vertical line, it means the lane departure, at this time, the double vertical line is showed by a warning icon for caution;

D. a second vehicle location icon displayed on the display module is located above the first vehicle location icon in the middle of the double vertical line, the second vehicle location icon represents the location of the front vehicle, the second vehicle location icon moves up and down according to the front vehicle distance detected by the distance detection module.

The displaying step A, when the image recognition module cannot detect the lane line, the double vertical line is hidden without being displayed.

The displaying step C, the warning icon is provided to warn by flashing the double vertical line.

The displaying step C, the warning icon is provided to warn by changing the color of the double vertical line.

The displaying step D, wherein when the distance detection module detects that the front vehicle is too far or there is no vehicle, the second vehicle location icon is hidden without being displayed.

The displaying step D, wherein when the detection environment is not good for the distance detection module to accurately determine the location of the front vehicle, the second vehicle location icon is replaced by other marked icon, the marked icon is a question mark or a dotted line icon.

The above method for displaying the vehicle safety distance further includes a displaying step E, the first vehicle location icon is increased upwards or shortened with the change of the car speed.

The displaying step E, wherein if the first vehicle location icon increased to contact the second vehicle location icon, it represents that the front vehicle distance is too short and the present vehicle is in an unsafe condition; the first vehicle location icon flashes or changes its color as a warning.

The above method for displaying the vehicle safety distance, further includes a displaying step E, wherein the first vehicle location icon is increased upwards or shortened with the change of the car speed, if the first vehicle location icon is increased to contact the second vehicle location icon, it represents that the front vehicle distance is too short and the present vehicle is in an unsafe condition; the vehicle safety warning device further includes a speaker module, which is provide to send out a sound signal as a warning.

The third embodiment of the displaying method for vehicle safety warning of the present invention, which includes a vehicle safety warning device, the vehicle safety warning device has a display module, an image recognition module, a distance detection module and a car speed detection module; different icons are used to be displayed on the display module to show different situations on the road, the displaying steps includes:

A. a double vertical line is displayed on the display module;

B. a first vehicle location icon is displayed on the display module, the first vehicle location icon represents the location of the vehicle, the first vehicle location icon is placed in the middle of the double vertical line, the first vehicle location icon moves left and right according to the actual location in the lane detected by the image recognition module;

C. when the first vehicle location icon displayed on the display module is overlapped on the double vertical line, it means the lane departure, at this time, the double vertical line is showed by a warning icon flashing or changing color for caution;

D. a second vehicle location icon displayed on the display module is located above the first vehicle location icon in the middle of the double vertical line, the second vehicle location icon represents the location of the front vehicle, the second vehicle location icon moves up and down according to the front vehicle distance detected by the distance detection module;

E. a safe vehicle distance icon is displayed on the display module, which is set between the first vehicle location icon and the second vehicle location icon, the length of the safe vehicle distance icon is changed according to the car speed detected by the car speed detection module.

The displaying step A, when the image recognition module cannot detect the lane line, the double vertical line is hidden without being displayed.

The displaying step C, the warning icon is provided to warn by flashing the double vertical line.

The displaying step C, the warning icon is provided to warn by changing the color of the double vertical line.

The displaying step D, wherein when the distance detection module detects that the front vehicle is too far or there is no vehicle, the second vehicle location icon is hidden without being displayed.

The displaying step D, wherein when the detection environment is not good for the distance detection module to accurately determine the location of the front vehicle, the second vehicle location icon is replaced by other marked icon, the marked icon is a question mark or a dotted line icon.

The displaying step E, wherein, the safe vehicle distance icon with the second vehicle location icon as its top end is increased upwards or shortened with the change of the car speed.

The displaying step E, wherein if the first vehicle location icon is increased to contact the second vehicle location icon, it represents that the front vehicle distance is too short and the present vehicle is in an unsafe condition; the first vehicle location icon flashes or changes its color as a warning.

The displaying step E, wherein the safe vehicle distance icon with the second vehicle location icon as its top end is increased upwards or shortened with the change of the car speed, if the first vehicle location icon is increased to contact the second vehicle location icon, it represents that the front vehicle distance is too short and the present vehicle is in an unsafe condition; the vehicle safety warning device further includes a speaker module, which is provide to send out a sound signal as a warning.

The displaying step E, wherein, the safe vehicle distance icon with the first vehicle location icon as its bottom end is increased upwards or shortened with the change of the car speed.

The displaying step E, wherein if the first vehicle location icon increased to contact the second vehicle location icon, it represents that the front vehicle distance is too short and the present vehicle is in an unsafe condition; the first vehicle location icon flashes or changes its color as a warning.

The displaying step E, wherein the safe vehicle distance icon with the first vehicle location icon as its bottom end is increased upwards or shortened with the change of the car speed, if the first vehicle location icon is increased to contact the second vehicle location icon, it represents that the front vehicle distance is too short and the present vehicle is in an unsafe condition; the vehicle safety warning device further includes a speaker module, which is provide to send out a sound signal as a warning.

BRIEF DESCRIPTION OF THE INVENTION

The detail structure, the applied principle, the function and the effectiveness of the present invention can be more fully understood with reference to the following description and accompanying drawings, in which.

DETAILED DESCRIPTION OF THE PREFERRED EMBODIMENTS

Figure 1:
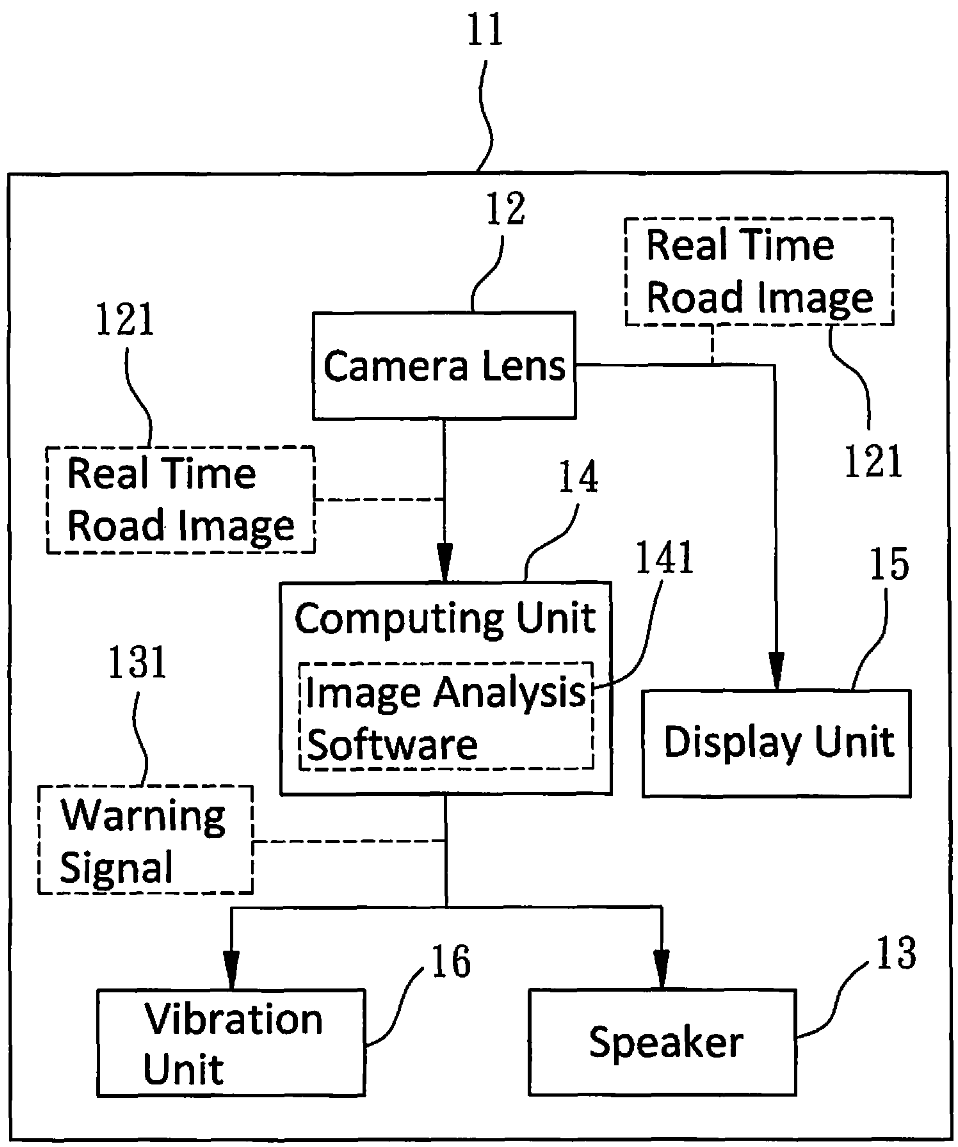
FIG. 1 PRIOR ART
FIG. 1 is a block diagram of the prior art.
Figure 2:
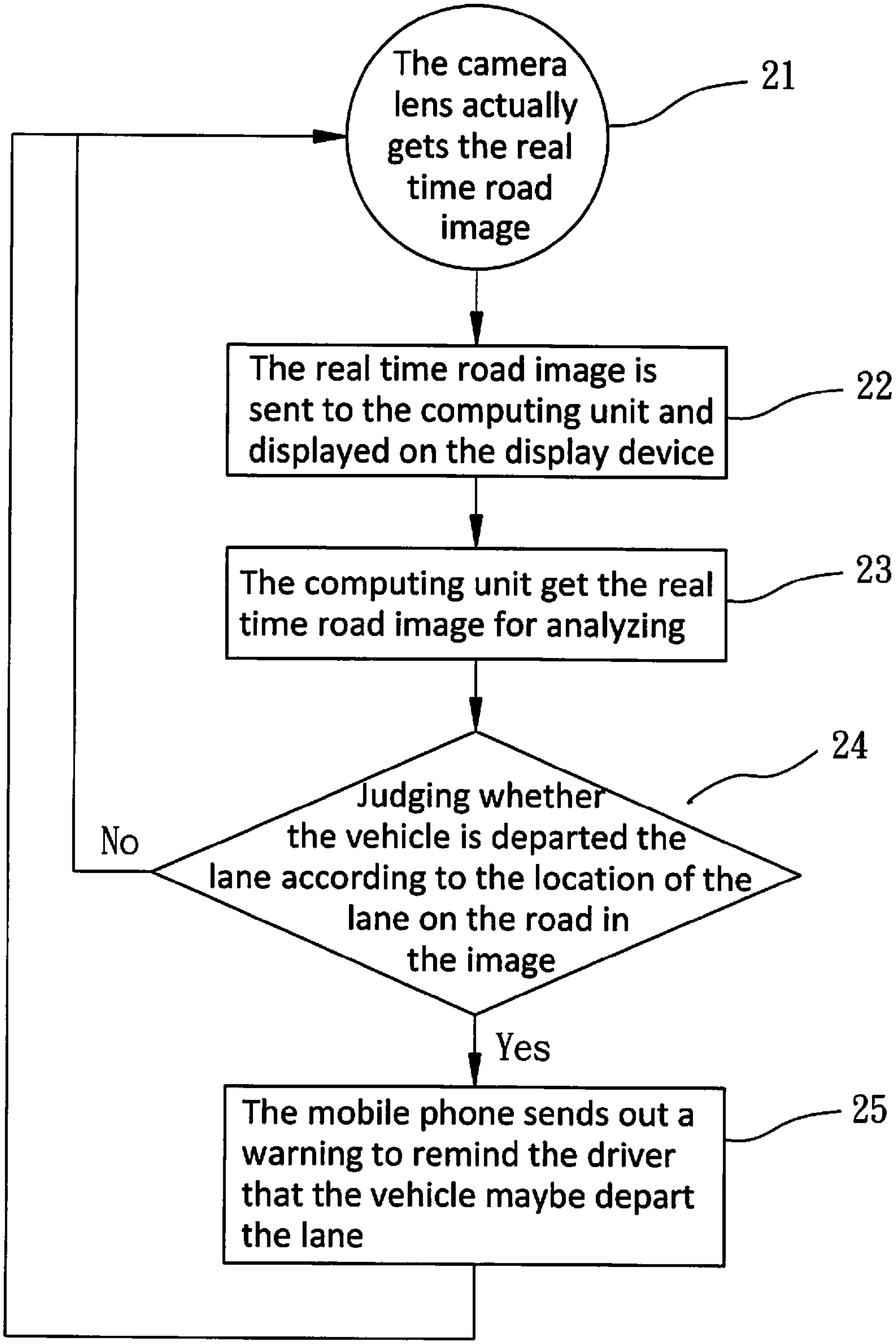
FIG. 2 PRIOR ART
FIG. 2 is an implementation flowchart of the operation method of the prior art.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

Figure 3:
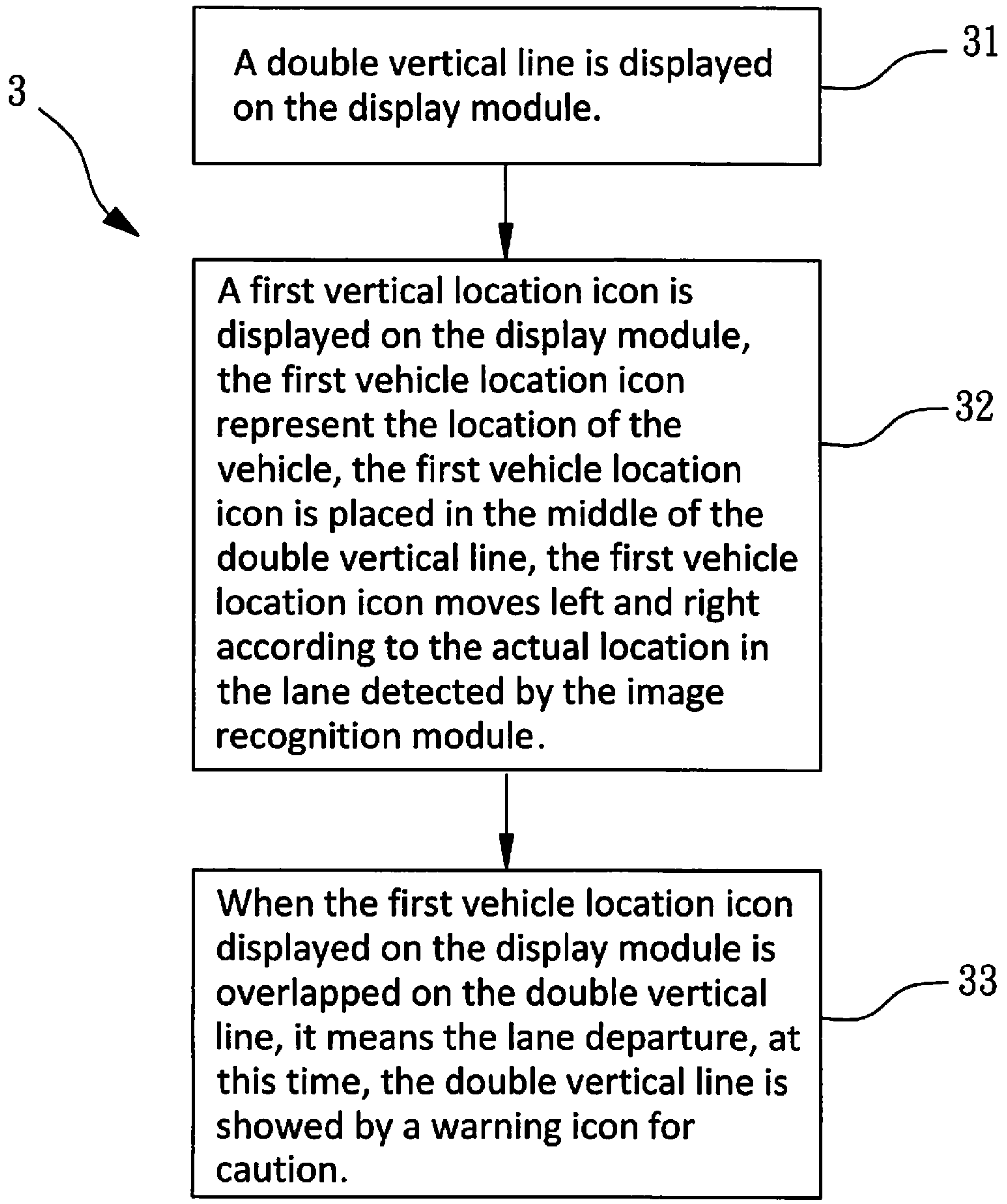
FIG. 3 is an implementation flowchart of the first embodiment of the present invention.
Figure 4:
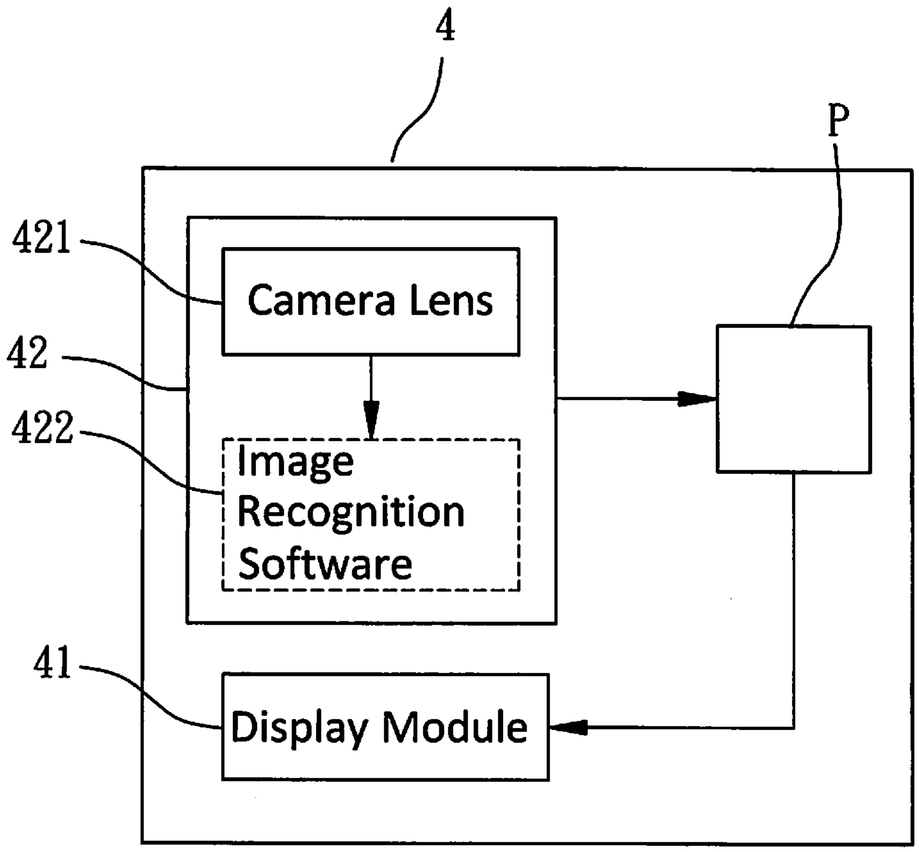
FIG. 4 is a block diagram of the first embodiment of the present invention.

As shown in FIG. 3, FIG. 4, it is the first embodiment of the present invention, which includes a vehicle safety warning device 4 electrically connected to a microprocessor P, the vehicle safety warning device 4 has a display module 41 and an image recognition module 42.

Figure 5:
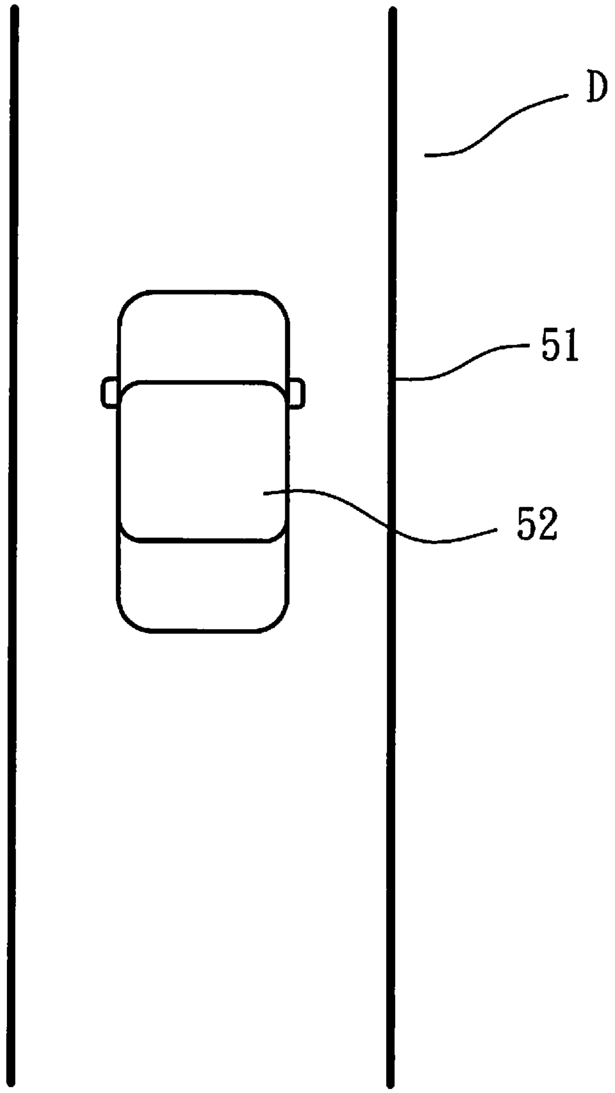
FIG. 5 is a schematic diagram (1) of the displaying image of the present invention.

The display module 41, different icons are used to be displayed on the display module 41 to show different situations on the road, the image D displayed on the display device 41 is the virtual illustration drawn by the vehicle safety warning device 4 (as shown in FIG. 5), not drawn the icons on the realistic images shot by the camera lens 421.

The image recognition module 42 includes a camera lens 421 and a image recognition software 422, the image recognition software 422 is used to recognize images based on the images shot by the camera lens 421. If the image recognition software 422 does not detect the two lane lines, but only detect one way lane line, another lane line is estimated by the width of a normal lane.

Figure 6:
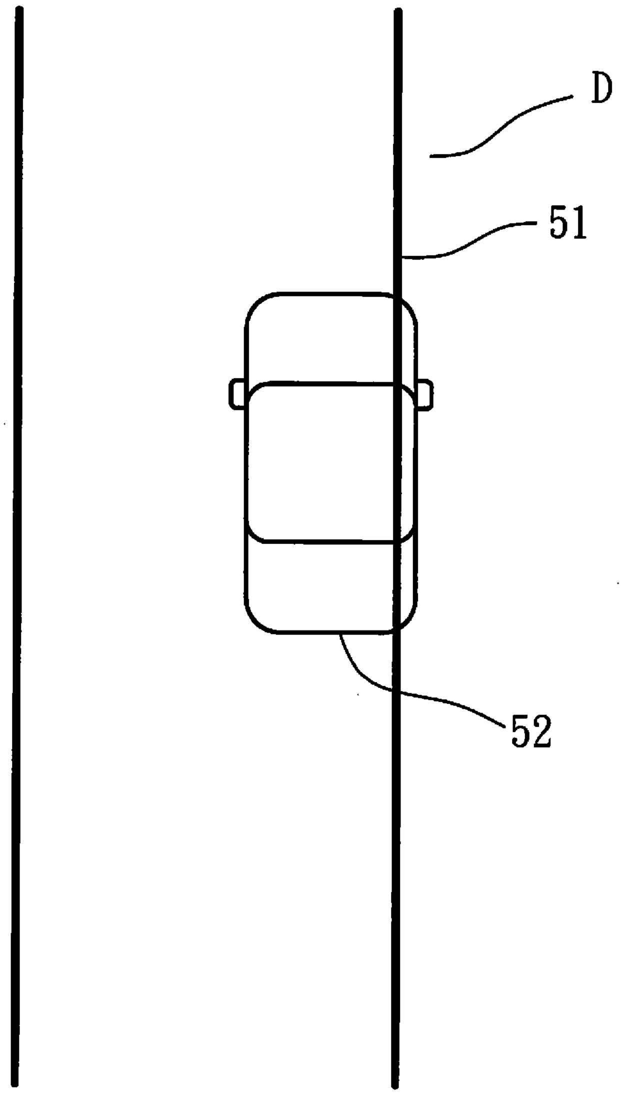
FIG. 6 is a schematic diagram (2) of the displaying image of the present invention.

Under the basic structure of the vehicle safety warning device 4, the displaying steps (as shown in FIG. 3) of the method for displaying the vehicle safety distance 3 of the present invention, includes:

In step 31, a double vertical line 51 is displayed on the display module 41 (as shown in FIG. 5); the double vertical line 51 represents the lane lines on both sides of the present car (which means the car driven by the driver), the double vertical line 51 is not limited to a line, but a virtual icon drawn according to the lane lines of the actual road. When the lane line of the actual road is a curve, the double vertical line 51 is a curve correspondingly;

in step 32, a first vehicle location icon 52 is displayed on the display module 41, the first vehicle location icon 52 represents the location of the present vehicle, the first vehicle location icon 52 is placed in the middle of the double vertical line 51, the first vehicle location icon 52 moves left and right according to the actual location in the lane detected by the image recognition module 42;

in step 33, when the first vehicle location icon 52 displayed on the display module 41 is overlapped on the double vertical line 51 (as shown in FIG. 6), it means the lane departure, at this time, the double vertical line 51 is showed by a warning icon for caution.

The displaying step 31, when the image recognition module 42 cannot detect the lane line, the double vertical line 51 is hidden without being displayed.

The displaying step 33, the warning icon is provided to warn by flashing the double vertical line 51.

The displaying step 33, the warning icon is provided to warn by changing the color of the double vertical line 51.

Figure 7:
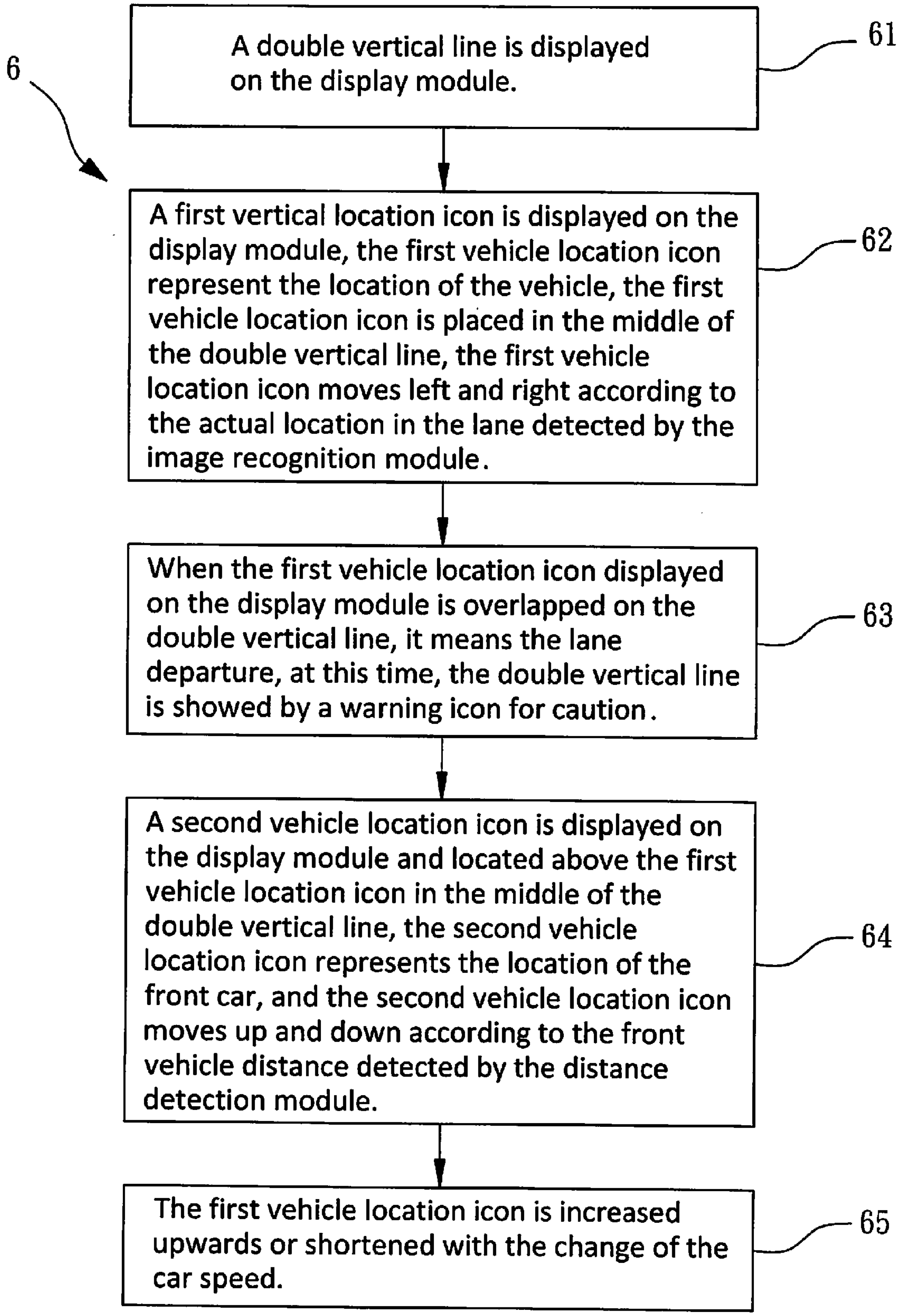
FIG. 7 is an implementation flowchart of the second embodiment of the present invention.
Figure 8:
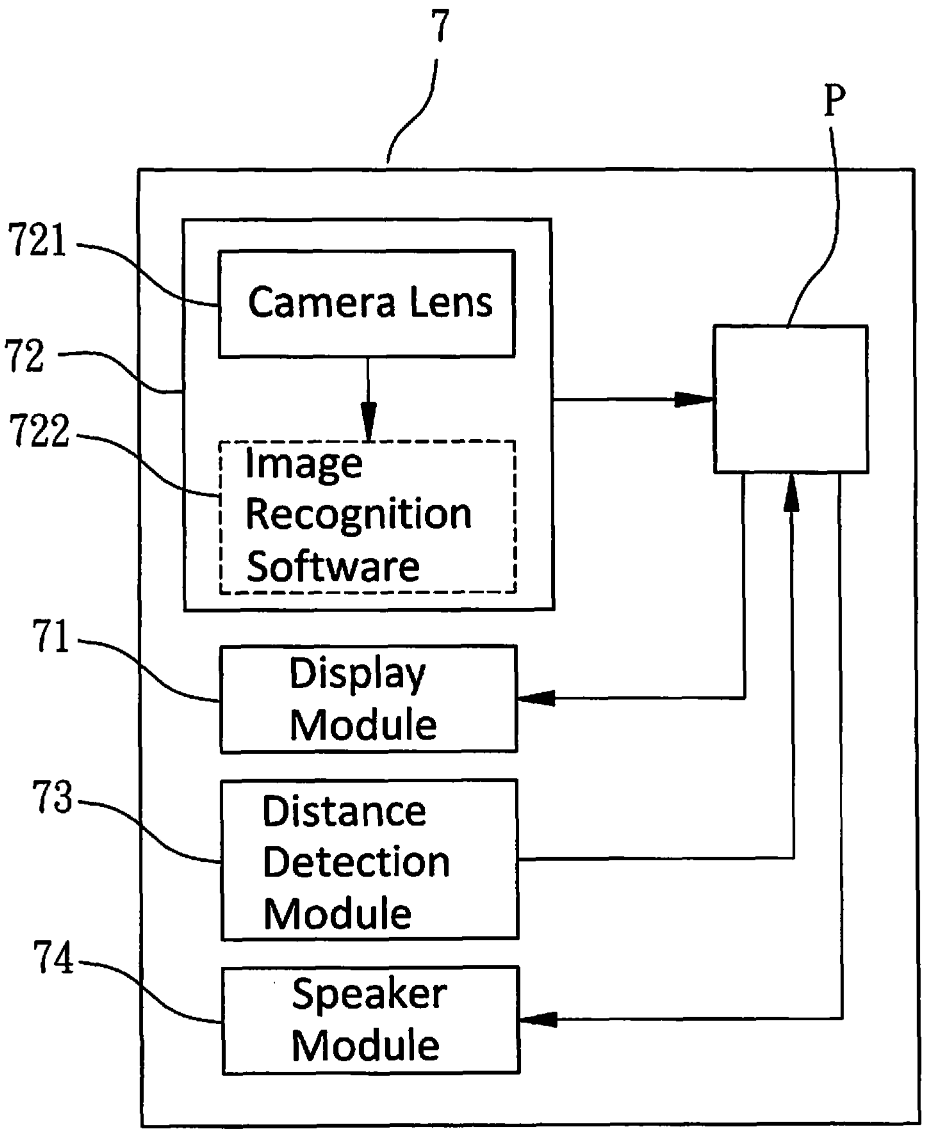
FIG. 8 is a block diagram of the second embodiment of the present invention.

As shown in FIG. 7, FIG. 8, it is the second embodiment of the present invention, which includes a vehicle safety warning device 7 electrically connected to a microprocessor P, the vehicle safety warning device 7 has a display module 71, an image recognition module 72 and a distance detection module 73.

The display module 71, different icons are used to be displayed on the display module 71 to show different situations on the road, the image D displayed on the display device 41 is the virtual illustration drawn by the vehicle safety warning device 7 (as shown in FIG. 5), not drawn the icons on the realistic images shot by the camera lens 721.

The image recognition module 72 includes a camera lens 721 and a image recognition software 722, the image recognition software 722 is used to recognize images based on the images shot by the camera lens 721. If the image recognition software 722 does not detect the two lane lines, but only detect one way lane line, another lane line is estimated by the width of a normal lane.

The distance detection module 73, which is provided to detect the distance between the present car and the front car, the detection method is an image ranging, a radar ranging or an infrared ranging detection technology.

The vehicle safety warning device 7 further includes a speaker module 74.

Figure 9:
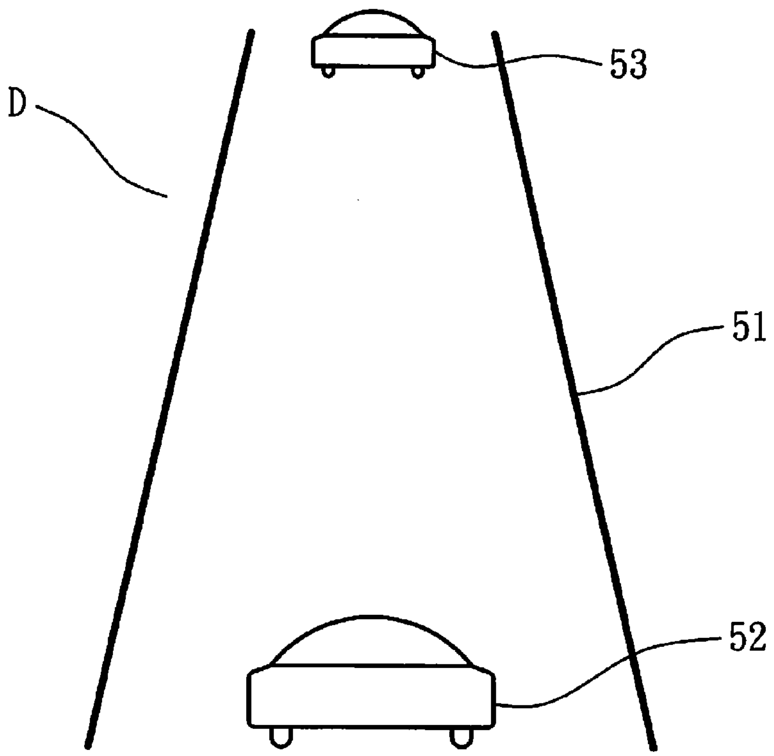
FIG. 9 is a schematic diagram (3) of the displaying image of the present invention.

Under the structure of the vehicle safety warning device 7, the displaying steps (as shown in FIG. 7) of the method for displaying the vehicle safety distance 6 of the present invention, includes:

In step 61, a double vertical line 51 is displayed on the display module 71 (as shown in FIG. 5); the double vertical line 51 represents the lane lines on both sides of the present car (which means the car driven by the driver), the double vertical line 51 is not limited to a line, but a virtual icon drawn according to the lane lines of the actual road. When the lane line of the actual road is a curve, the double vertical line 51 is a curve correspondingly;

in step 62, a first vehicle location icon 52 is displayed on the display module 71, the first vehicle location icon 52 represents the location of the present vehicle, the first vehicle location icon 52 is placed in the middle of the double vertical line 51, the first vehicle location icon 52 moves left and right according to the actual location in the lane detected by the image recognition module 72;

in step 63, when the first vehicle location icon 52 displayed on the display module 71 is overlapped on the double vertical line 51 (as shown in FIG. 6), it means the lane departure, at this time, the double vertical line 51 is showed by a warning icon for caution;

in step 64, a second vehicle location icon 53 is displayed on the display module 71, which is located above the first vehicle location icon 52 in the middle of the double vertical line 51 (as shown in FIG. 9), the second vehicle location icon 53 represents the location of the front car, and the second vehicle location icon 53 moves up and down according to the front vehicle distance detected by the distance detection module 73.

The displaying step 61, when the image recognition module 72 cannot detect the lane line, the double vertical line 51 is hidden without being displayed.

The displaying step 63, the warning icon is provided to warn by flashing the double vertical line 51.

The displaying step 63, the warning icon is provided to warn by changing the color of the double vertical line 51.

The displaying step 64, wherein when the distance detection module 73 detects that the front vehicle is too far or there is no vehicle, the second vehicle location icon 53 is hidden without being displayed.

The displaying step 64, wherein when the detection environment is not good for the distance detection module 73 to accurately determine the location of the front vehicle, the second vehicle location icon 53 is replaced by other marked icon, the marked icon is a question mark or a dotted line icon.

Figure 10:
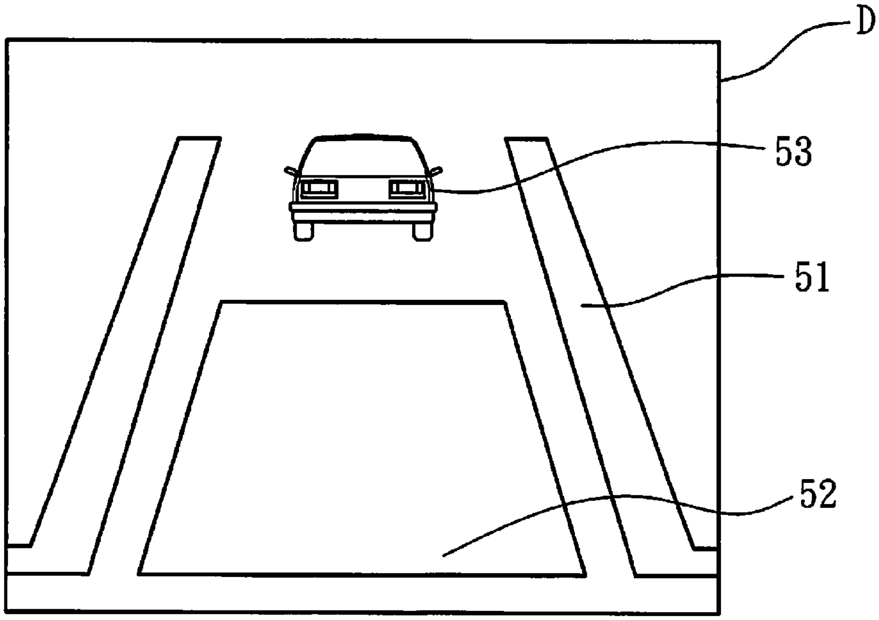
FIG. 10 is a schematic diagram (4) of the displaying image of the present invention.

The above method for displaying the vehicle safety distance 6 of the present invention further includes a step 65, the first vehicle location icon 52 is increased upwards or shortened with the change of the car speed (as shown in FIG. 10).

Figure 11:
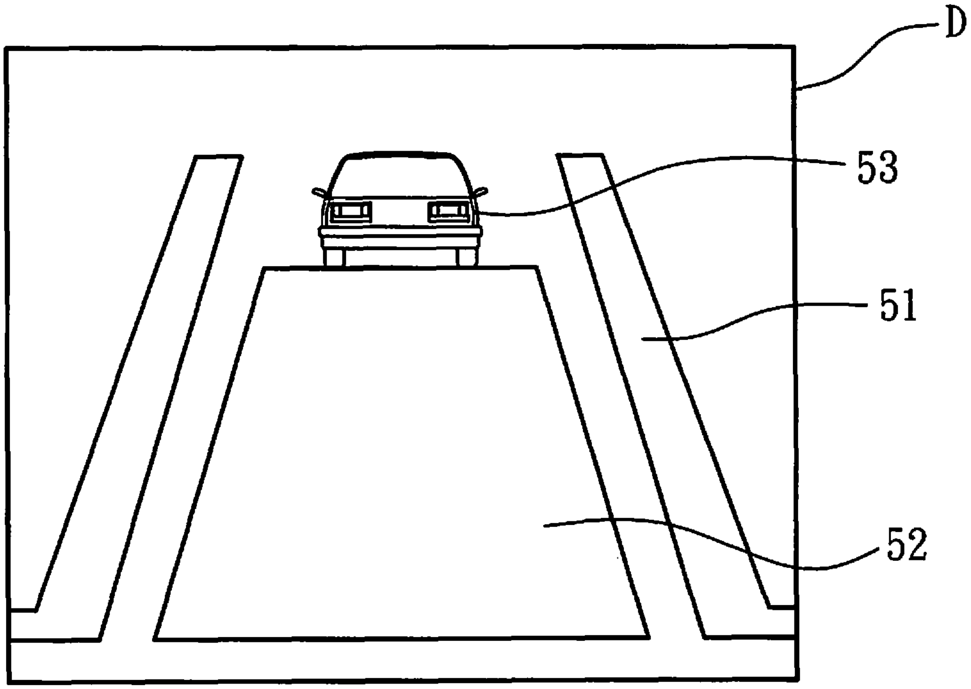
FIG. 11 is a schematic diagram (5) of the displaying image of the present invention.

The displaying step 65, wherein if the first vehicle location icon 52 is increased to contact the second vehicle location icon 53 (as shown in FIG. 11), it represents that the front vehicle distance is too short and the present vehicle is in an unsafe condition; the first vehicle location icon 52 flashes or changes its color as a warning, the speaker module 74 is further used to send out a sound signal (such as voice or beep) as a warning.

Figure 12:
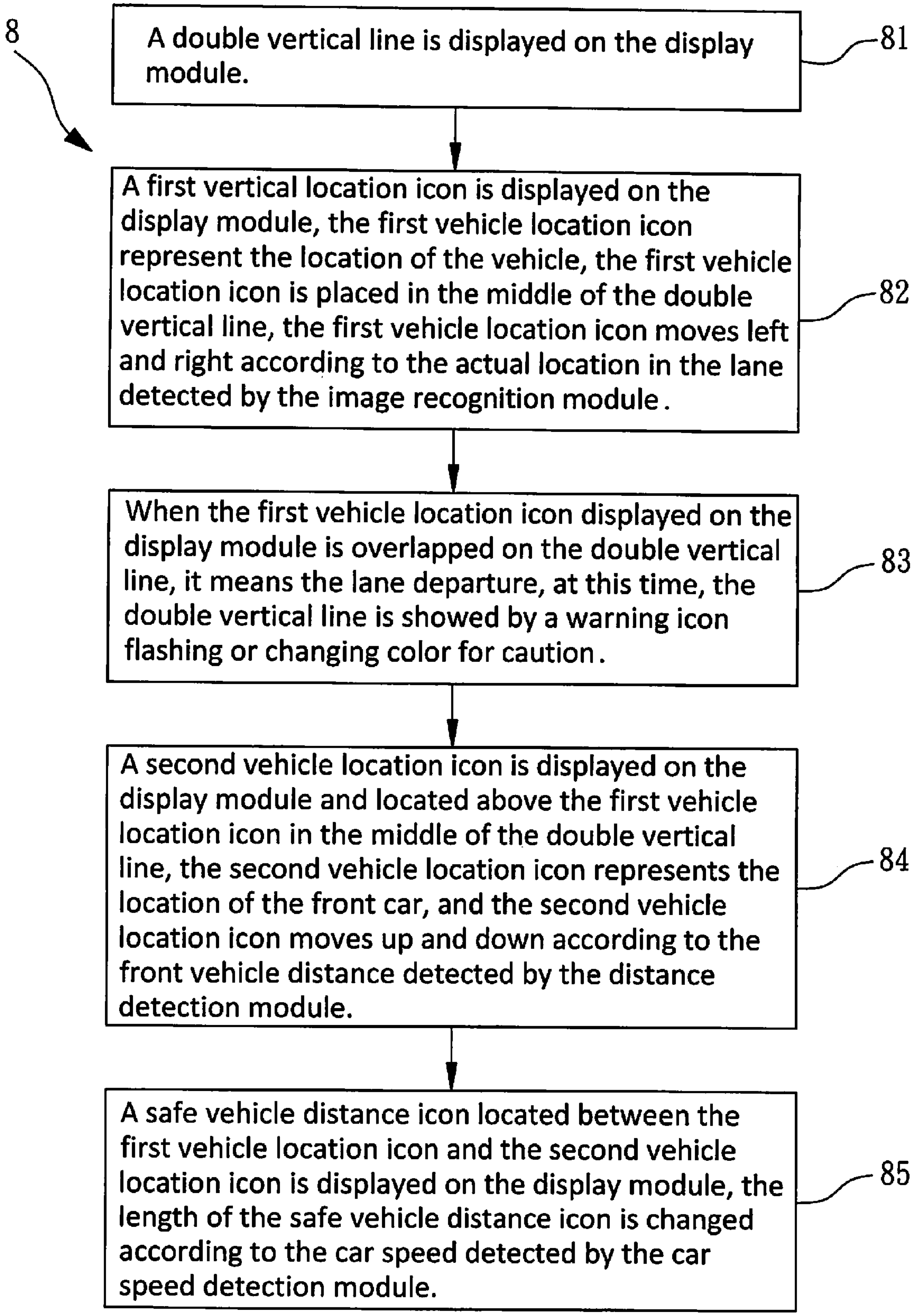
FIG. 12 is an implementation flowchart of the third embodiment of the present invention.
Figure 13:
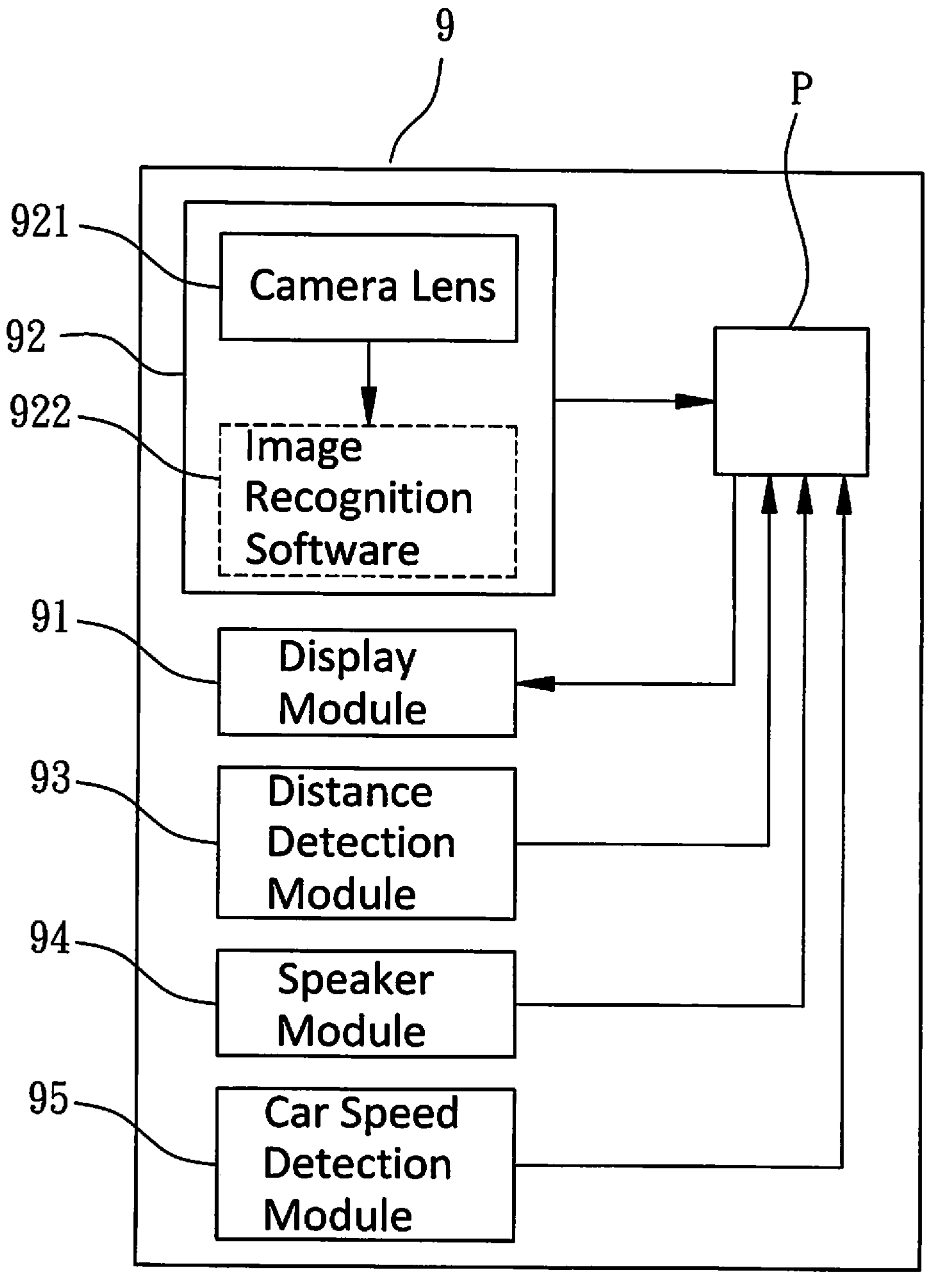
FIG. 13 is a block diagram of the third embodiment of the present invention.

As shown in FIG. 12, FIG. 13, it is the third embodiment of the present invention, which includes a vehicle safety warning device 9 electrically connected to a microprocessor P, the vehicle safety warning device 9 has a display module 91, an image recognition module 92, a distance detection module 93 and a car speed detection module 95.

The display module 91, different icons are used to be displayed on the display module 91 to show different situations on the road, the image D displayed on the display device 91 is the virtual illustration drawn by the vehicle safety warning device 9 (as shown in FIG. 5), not drawn the icons on the realistic images shot by the camera lens 921.

The image recognition module 92 includes a camera lens 921 and a image recognition software 922, the image recognition software 922 is used to recognize images based on the images shot by the camera lens 921. If the image recognition software 922 does not detect the two lane lines, but only detect one way lane line, another lane line is estimated by the width of a normal lane.

The distance detection module 93, which is provided to detect the distance between the present car and the front car, the detection method is an image ranging, a radar ranging or an infrared ranging detection technology.

The car speed detection module 95, which is used to detect the car speed of the present vehicle, the detection method is receiving a car speed signal provided by the car, or a detection technology, such as the GPS speed detection.

The vehicle safety warning device 9 further includes a speaker module 94.

Under the structure of the vehicle safety warning device 9, the displaying steps (as shown in FIG. 12) of the method for displaying the vehicle safety distance 8 of the present invention, includes:

In step 81, a double vertical line 51 is displayed on the display module 91 (as shown in FIG. 5); the double vertical line 51 represents the lane lines on both sides of the present car (which means the car driven by the driver), the double vertical line 51 is not limited to a line, but a virtual icon drawn according to the lane lines of the actual road. When the lane line of the actual road is a curve, the double vertical line 51 is a curve correspondingly;

in step 82, a first vehicle location icon 52 is displayed on the display module 91, the first vehicle location icon 52 represents the location of the present vehicle, the first vehicle location icon 52 is placed in the middle of the double vertical line 51, the first vehicle location icon 52 moves left and right according to the actual location in the lane detected by the image recognition module 92;

in step 83, when the first vehicle location icon 52 displayed on the display module 91 is overlapped on the double vertical line 51 (as shown in FIG. 6), it means the lane departure, at this time, the double vertical line 51 is showed by a warning icon for caution;

in step 84, a second vehicle location icon 53 is displayed on the display module 91, which is located above the first vehicle location icon 52 in the middle of the double vertical line 51 (as shown in FIG. 9), the second vehicle location icon 53 represents the location of the front car, and the second vehicle location icon 53 moves up and down according to the front vehicle distance detected by the distance detection module 93.

Figure 14:
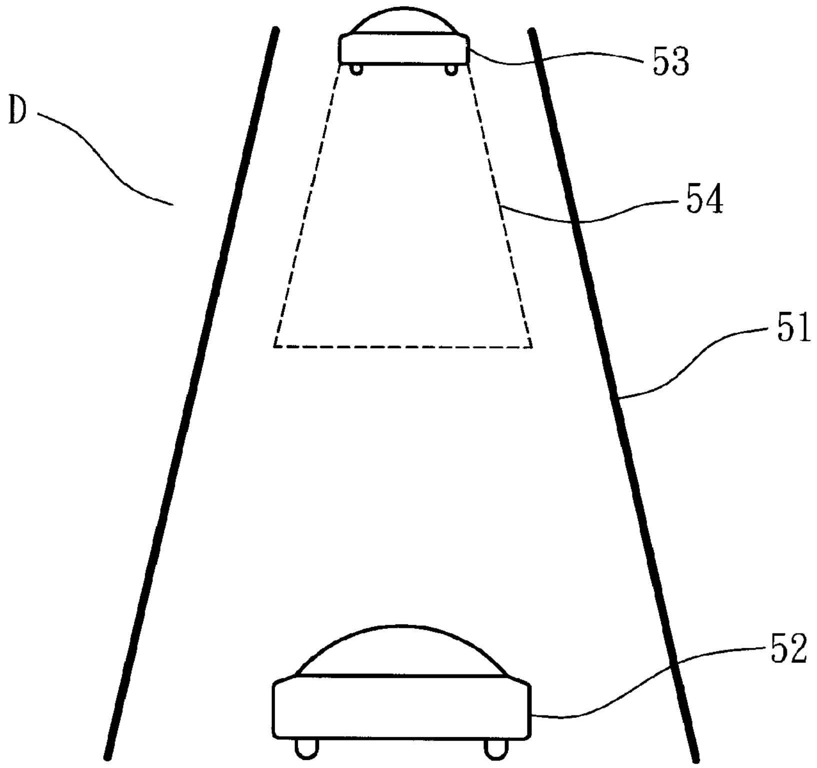
FIG. 14 is a schematic diagram (6) of the displaying image of the present invention.

Step 85, a safe vehicle distance icon 54 (as shown in FIG. 14) is displayed on the display module 91, which is set between the first vehicle location icon 52 and the second vehicle location icon 53, the length of the safe vehicle distance icon 54 is changed according to the car speed detected by the car speed detection module.

In the displaying step 81, wherein the double vertical line 51 is hidden without being displayed when the image recognition module 92 cannot detect the lane line.

The displaying step 83, the warning icon is provided to warn by flashing the double vertical line 51.

The displaying step 83, the warning icon is provided to warn by changing the color of the double vertical line 51.

In the displaying step 84, wherein the double vertical line 51 is hidden without being displayed when the distance detection module 93 detects that the front car is too far or there is no car, the second vehicle location icon 53 is hidden without being displayed.

The displaying step 84, wherein when the detection environment is not good for the distance detection module 93 to accurately determine the location of the front vehicle, the second vehicle location icon 53 is replaced by other marked icon, the marked icon is a question mark or a dotted line icon.

The displaying step 85, wherein the safe vehicle distance 54 with the second vehicle location icon 53 as its top end (as shown in FIG. 14) is increased upwards or shortened with the change of the car speed.

The displaying step 85, wherein if the safe vehicle distance icon 54 is increased to contact the first vehicle location icon 52, it represents that the front vehicle distance is too short and the present vehicle is in an unsafe condition; the safe vehicle distance icon 54 flashes or changes its color as a warning, the speaker module 94 is further used to send out a sound signal (such as voice or beep) as a warning.

Figure 15:
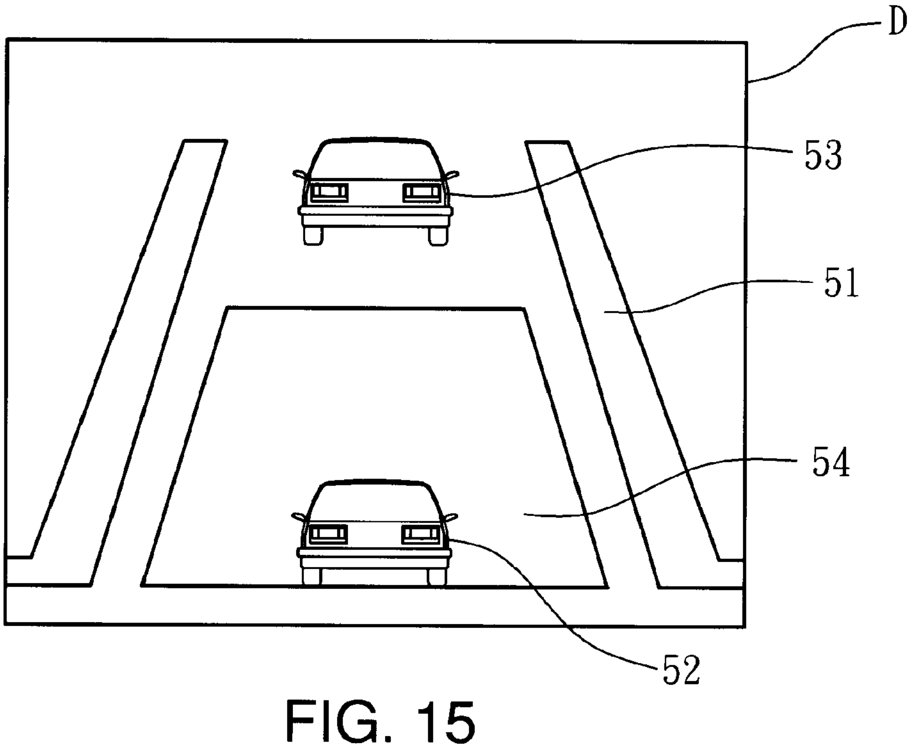
FIG. 15 is a schematic diagram (7) of the displaying image of the present invention.

In the displaying step 85, wherein the safe vehicle distance 54 with the first vehicle location icon 52 as its bottom end is increased upwards or shortened with the change of the car speed (as shown in FIG. 15).

The displaying step 85, wherein if the safe vehicle distance icon 54 is increased upwards to contact the second vehicle location icon 53, it represents that the front vehicle distance is too short and the present vehicle is in an unsafe condition; the safe vehicle distance icon 54 flashes or changes its color as a warning, the speaker module 94 is further used to send out a sound signal (such as voice or beep) as a warning.

I claim:

1. A displaying method for vehicle safety warning, which comprises the steps of:

selecting a vehicle safety warning device having a display module, an image recognition module and a distance detection module; displaying different icons on the display module to show different situations on a road;

first displaying a double vertical line on the display module;

second displaying a first vehicle location icon on the display module, the first vehicle location icon representing the location of a vehicle, placing the first vehicle location icon in the middle of the double vertical line, moving the first vehicle location icon left and right according to the actual location in the lane detected by the image recognition module;

showing the double vertical line as a warning icon for caution when the first vehicle location icon displayed on the display module is overlapped on the double vertical line meaning lane departure;

third displaying a second vehicle location icon on the display module above the first vehicle location icon in the middle of the double vertical line, the second vehicle location icon representing the location of a front vehicle, the second vehicle location icon moving up and down according to the front vehicle distance detected by the distance detection module; and moving the first vehicle location icon and selectively lengthening and shortening the first vehicle location icon as a speed of the vehicle changes to increase and decrease a distance between the first vehicle location icon and the second vehicle location icon.

2. The method for displaying the vehicle safety distance as claimed in claim 1, wherein in the first displaying step, when the image recognition module cannot detect a lane line, the double vertical line is hidden without being displayed.

3. The method for displaying the vehicle safety distance as claimed in claim 1, wherein in the second displaying step, the warning icon is provided to warn by flashing the double vertical line.

4. The method for displaying the vehicle safety distance as claimed in claim 1, wherein in the second displaying step, the warning icon is provided to warn by changing the color of the double vertical line.

5. The method for displaying the vehicle safety distance as claimed in claim 1, wherein in the third displaying step, when the distance detection module detects that the front vehicle is too far or there is no vehicle, the second vehicle location icon is hidden without being displayed.

6. The method for displaying the vehicle safety distance as claimed in claim 1, wherein in the third displaying step, when the detection environment is not good for the distance detection module to accurately determine the location of the front vehicle, the second vehicle location icon is replaced by other marked icon, the marked icon is a question mark or a dotted line icon.

7. The method for displaying the vehicle safety distance as claimed in claim 1, wherein the moving step F further comprises, if the first vehicle location icon is increased to contact the second vehicle location icon, it represents that the front vehicle distance is too short and the present vehicle is in an unsafe condition; the first vehicle location icon flashes or changes its color as a warning.

8. The method for displaying the vehicle safety distance as claimed in claim 1, wherein the moving step F further comprises, and if the first vehicle location icon is increased to contact the second vehicle location icon, it represents that the front vehicle distance is too short and the present vehicle is in an unsafe condition; the vehicle safety warning device further includes a speaker module, which is provide to send out a sound signal as a warning.

9. A displaying method for vehicle safety warning, which comprises the steps of:

- selecting a vehicle safety warning device having a display module, an image recognition module, a distance detection module and a car speed detection module, displaying different icons on the display module to show different situations on a road;
- first displaying a double vertical line on the display module;
- second displaying a first vehicle location icon on the display module, the first vehicle location icon representing the location of a vehicle, placing the first vehicle location icon in the middle of the double vertical line, moving the first vehicle location icon left and right according to the actual location in the lane detected by the image recognition module;
- showing the double vertical line as a warning icon and flashing the warning icon or changing a color of the warning icon for caution when the first vehicle location icon displayed on the display module is overlapped on the double vertical line meaning lane departure;
- third displaying a second vehicle location icon on the display module above the first vehicle location icon in the middle of the double vertical line, the second vehicle location icon representing the location of a front vehicle, moving the second vehicle location icon up and down according to the front vehicle distance detected by the distance detection module;
- fourth displaying a safe vehicle distance icon on the display module, positioning the safe vehicle distance icon between the first vehicle location icon and the second vehicle location icon, and selectively lengthening and shortening the safe vehicle distance icon according to a car speed of the vehicle detected by the car speed detection module to increase and decrease a distance between the safe vehicle distance icon and the second vehicle location icon.

10. The method for displaying the vehicle safety distance as claimed in claim 9, wherein in the first displaying step, when the image recognition module cannot detect the lane line, the double vertical line is hidden without being displayed.

11. The method for displaying the vehicle safety distance as claimed in claim 9, wherein in the second displaying step, the warning icon is provided to warn by flashing the double vertical line.

12. The method for displaying the vehicle safety distance as claimed in claim 9, wherein in the second displaying step, the warning icon is provided to warn by changing the color of the double vertical line.

13. The method for displaying the vehicle safety distance as claimed in claim 9, wherein in the third displaying step, when the distance detection module detects that the front vehicle is too far or there is no vehicle, the second vehicle location icon is hidden without being displayed.

14. The method for displaying the vehicle safety distance as claimed in claim 9, wherein in the third displaying step, when the detection environment is not good for the distance detection module to accurately determine the location of the front vehicle, the second vehicle location icon is replaced by other marked icon, the marked icon is a question mark or a dotted line icon.

15. The method for displaying the vehicle safety distance as claimed in claim 9, wherein the fourth displaying step, the safe vehicle distance icon with the second vehicle location icon as a top end thereof is downwardly lengthened or shortened with the change of the car speed.

16. The method for displaying the vehicle safety distance as claimed in claim 9, wherein the fourth displaying step, the safe vehicle distance icon with the second vehicle location icon as a top end thereof is downwardly lengthened or shortened with the change of the car speed, and if the first vehicle location icon is increased to contact the second vehicle location icon, it represents that the front vehicle distance is too short and the present vehicle is in an unsafe condition; the first vehicle location icon flashes or changes its color as a warning.

17. The method for displaying the vehicle safety distance as claimed in claim 9, wherein the fourth displaying step, the safe vehicle distance icon with the second vehicle location icon as a top end thereof is downwardly lengthened or shortened with the change of the car speed, and if the first vehicle location icon is increased to contact the second vehicle location icon, it represents that the front vehicle distance is too short and the present vehicle is in an unsafe condition; the vehicle safety warning device further includes a speaker module, which is provide to send out a sound signal as a warning.

18. The method for displaying the vehicle safety distance as claimed in claim 9, wherein the fourth displaying step, the safe vehicle distance icon with the first vehicle location icon as a bottom end thereof is upwardly lengthened or shortened with the change of the car speed.

19. The method for displaying the vehicle safety distance as claimed in claim 9, wherein the fourth displaying step, the safe vehicle distance icon with the first vehicle location icon as a bottom end thereof is upwardly lengthened or shortened with the change of the car speed, and if the safe vehicle distance icon is increased to contact the second vehicle location icon, it represents that the front vehicle distance is too short and the present vehicle is in an unsafe condition; the safe vehicle distance icon flashes or changes its color as a warning.

20. The method for displaying the vehicle safety distance as claimed in claim 9, wherein the fourth displaying step, the safe vehicle distance icon with the first vehicle location icon as a bottom end thereof is upwardly lengthened or shortened with the change of the car speed, and if the safe vehicle distance icon is increased to contact the second vehicle location icon, it represents that the front vehicle distance is too short and the present vehicle is in an unsafe condition; the vehicle safety warning device further includes a speaker module, which is provide to send out a sound signal as a warning.

* * * * *